(12) United States Patent
Wolcott et al.

(10) Patent No.: US 9,021,086 B2
(45) Date of Patent: Apr. 28, 2015

(54) SYSTEM AND METHOD FOR NETWORK MANAGEMENT

(75) Inventors: Lawrence Wolcott, Denver, CO (US); Justin Riggett, Denver, CO (US); Bryan Johnston, Eugena, OR (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 609 days.

(21) Appl. No.: 13/279,197

(22) Filed: Oct. 21, 2011

(65) Prior Publication Data

US 2013/0103822 A1 Apr. 25, 2013

(51) Int. Cl.
- *G06F 15/173* (2006.01)
- *H04L 12/24* (2006.01)
- *H04N 7/10* (2006.01)
- *H04N 21/647* (2011.01)

(52) U.S. Cl.
CPC ............... *H04L 41/12* (2013.01); *H04N 7/104* (2013.01); *H04N 21/64738* (2013.01)

(58) Field of Classification Search
None
See application file for complete search history.

(56) References Cited

U.S. PATENT DOCUMENTS

| | | | | |
|---|---|---|---|---|
| 6,477,238 B1* | 11/2002 | Schneider et al. | | 379/22.04 |
| 7,032,238 B2* | 4/2006 | Parnell et al. | | 725/107 |
| 7,089,580 B1* | 8/2006 | Vogel et al. | | 725/111 |
| 7,489,641 B2* | 2/2009 | Miller et al. | | 370/241.1 |
| 7,751,338 B2* | 7/2010 | Azenko et al. | | 370/252 |
| 7,839,794 B2* | 11/2010 | Semon et al. | | 370/241 |
| 7,898,977 B2* | 3/2011 | Roese et al. | | 370/254 |
| 8,004,962 B2* | 8/2011 | Yang et al. | | 370/216 |
| 8,065,100 B2* | 11/2011 | Lindqvist et al. | | 702/65 |
| 8,143,900 B2* | 3/2012 | Shimp et al. | | 324/527 |
| 8,325,613 B2* | 12/2012 | Okamoto | | 370/241 |
| 8,458,753 B2* | 6/2013 | Hasek et al. | | 725/86 |
| 8,558,552 B2* | 10/2013 | Chappell et al. | | 324/534 |
| 8,595,367 B1* | 11/2013 | Beser | | 709/228 |
| 8,635,495 B2* | 1/2014 | Beeco et al. | | 714/25 |
| 8,649,421 B2* | 2/2014 | Renken et al. | | 375/222 |
| 8,671,436 B2* | 3/2014 | Schlack | | 725/116 |
| 2002/0083476 A1* | 6/2002 | McNamara | | 725/148 |
| 2004/0203431 A1* | 10/2004 | Cooper | | 455/67.11 |
| 2006/0020924 A1* | 1/2006 | Lo et al. | | 717/127 |
| 2006/0250967 A1* | 11/2006 | Miller et al. | | 370/241 |
| 2007/0107034 A1* | 5/2007 | Gotwals | | 725/129 |
| 2008/0049792 A1* | 2/2008 | Ludwig | | 370/493 |
| 2008/0062889 A1* | 3/2008 | Azenko et al. | | 370/252 |
| 2009/0064255 A1* | 3/2009 | Jiang et al. | | 725/118 |
| 2009/0222124 A1* | 9/2009 | Latwesen | | 700/110 |
| 2010/0299713 A1* | 11/2010 | Salinger et al. | | 725/106 |
| 2011/0116387 A1* | 5/2011 | Beeco et al. | | 370/242 |
| 2011/0119375 A1* | 5/2011 | Beeco et al. | | 709/224 |
| 2011/0243214 A1* | 10/2011 | Wolcott et al. | | 375/232 |
| 2011/0286339 A1* | 11/2011 | Masuda | | 370/248 |
| 2012/0047544 A1* | 2/2012 | Bouchard | | 725/107 |
| 2012/0287796 A1* | 11/2012 | Finkelstein | | 370/248 |
| 2012/0297061 A1* | 11/2012 | Pedigo et al. | | 709/224 |
| 2013/0003565 A1* | 1/2013 | Gotwals et al. | | 370/248 |
| 2013/0004179 A1* | 1/2013 | Nielsen et al. | | 398/115 |
| 2013/0064279 A1* | 3/2013 | Nielsen et al. | | 375/227 |
| 2014/0331270 A1* | 11/2014 | Olson et al. | | 725/149 |

\* cited by examiner

*Primary Examiner* — Greg C Bengzon
(74) *Attorney, Agent, or Firm* — Ballard Spahr, LLP (57) ABSTRACT

System and methods for inferring network topology are described, including a method comprising determining a normalized transmit power of a first device, identifying a second device based upon a parameter of the second device and the normalized transmit power of the first device, and generating a topology including the first device and the second device based upon at least one of the normalized transmit power of the first device and the parameter of the second device.

20 Claims, 9 Drawing Sheets

```xml
<account num="84973032260329165">
 <amp id="DN12A1" value="17">
  <tap id="3288" value="23">
   <drop value="4" length="200">
    <ground_block value="44">
     <cable length="unknown">
      <splitter value="7" type="3-6 way">
       <cable>
        <device id="00:22:ce:9d:29:22" type="CM" uptx="51.0">
        </device>
       </cable>
       <cable>
        <device mac="00:22:10:3b:50:99" type="MTA" uptx="51.0">
         <nmter>1</nmter>
         <microreflection distance="85">1.5</microreflection>
        </device>
       </cable>
       <cable length="unknown">
        <splitter value="4" type="2 way">
         <cable>
          <device mac="00:15:a3:c5:a8:9d" type="MOTO_STB" uptx="55.0">
          </device>
         </cable>
         <cable>
          <device mac="00:0b:97:60:09:55" type="DTA" uptx="56.0">
          </device>
         </cable>
        </splitter>
       </cable>
      </splitter>
     </cable>
    </ground_block>
   </drop>
  </tap>
 </amp>
</account>
```

SYSTEM AND METHOD FOR NETWORK MANAGEMENT

BACKGROUND

When servicing equipment at a user location, knowledge of topology at the user location is essential to accurate troubleshooting. Furthermore, there may be no knowledge of a user's in-home wiring before additional services or equipment are offered.

Installers, technicians, and care agents are subject to guessing and frustrating trial-error evaluation of wiring. This sometimes results in unusually high installation and troubleshooting times due to unanticipated wiring challenges within the home.

SUMMARY

It is to be understood that both the following general description and the following detailed description are exemplary and explanatory only and are not restrictive. Provided are methods and systems for inferring a topology or layout of communication links and associated devices.

In an aspect, the systems and methods of the present disclosure leverage telemetry and design data to programmatically infer the most likely network topology within the customer's premises. Having knowledge of the wiring and component topology enables deterministic trouble isolation using radio frequency (RF) technologies such as DOCSIS Adaptive Equalization Analysis. The inferred topology information can be used by installers, technicians, and care agents to quickly locate common problems with in-home wiring. The inferred topology information reduces the time-to-repair and improves a customer's perception of service capabilities.

The systems and methods described herein can also be used to evaluate service readiness before deploying enhanced services to a customer's home, such as Multimedia over Coax Alliance (MoCA). The systems and methods are also useful for locating microreflection points within a customer's home. Conventionally, there are no practical applications to take advantage of detailed design drawings (plant maps) beyond the tap/drop. The systems and methods of the present disclosure extend the usefulness of the information in plant maps into areas within a customer's premises.

In an aspect, provided are methods for inferring network topology comprising determining a normalized transmit power of a first device, identifying a second device based on a parameter of the second device and the normalized transmit power of the first device, and generating a topology including the first device and the second device based upon at least one of the normalized transmit power of the first device and the parameter of the second device.

In another aspect, provided are methods for inferring network topology comprising determining a parameter for each of a plurality of devices, identifying each of the devices belonging to a first group, wherein a value of the parameter of each of the devices in the first group is less than or equal to the sum of a first baseline value and a first pre-defined variance value, and wherein each of the devices in the first group are coupled to a first splitter, and identifying each of the devices belonging to a second group, wherein a value of the parameter of each of the devices in the second group is less than or equal to the sum of a second baseline value and a second pre-defined variance value, and wherein each of the devices in the second group are coupled to a second splitter.

In a further aspect, provided are systems that can comprise a measurement device in signal communication with a first device to measure a transmit power of the first device; and a processor in communication with the measurement device, the processor configured to: determine a normalized transmit power of the first device based upon the transmit power measured; identify a second device based upon a parameter of the second device and the normalized transmit power of the first device; and generate a topology including the first device and the second device based upon at least one of the normalized transmit power of the first device and a parameter of the second device.

Although analysis of a home network is discussed, these techniques can be applied to a network of devices maintained by a service provider or an intermediary party between the user and the service provider.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

As described in greater detail below, in an aspect, a system can be configured to determine a network topology for a particular user location. In an aspect, a distribution system can distribute signals from a central location to the user location. Understanding the network topology for the user location can enable deterministic trouble isolation and remote analysis of wiring and/or wiring components at the user location.

Figure 1:
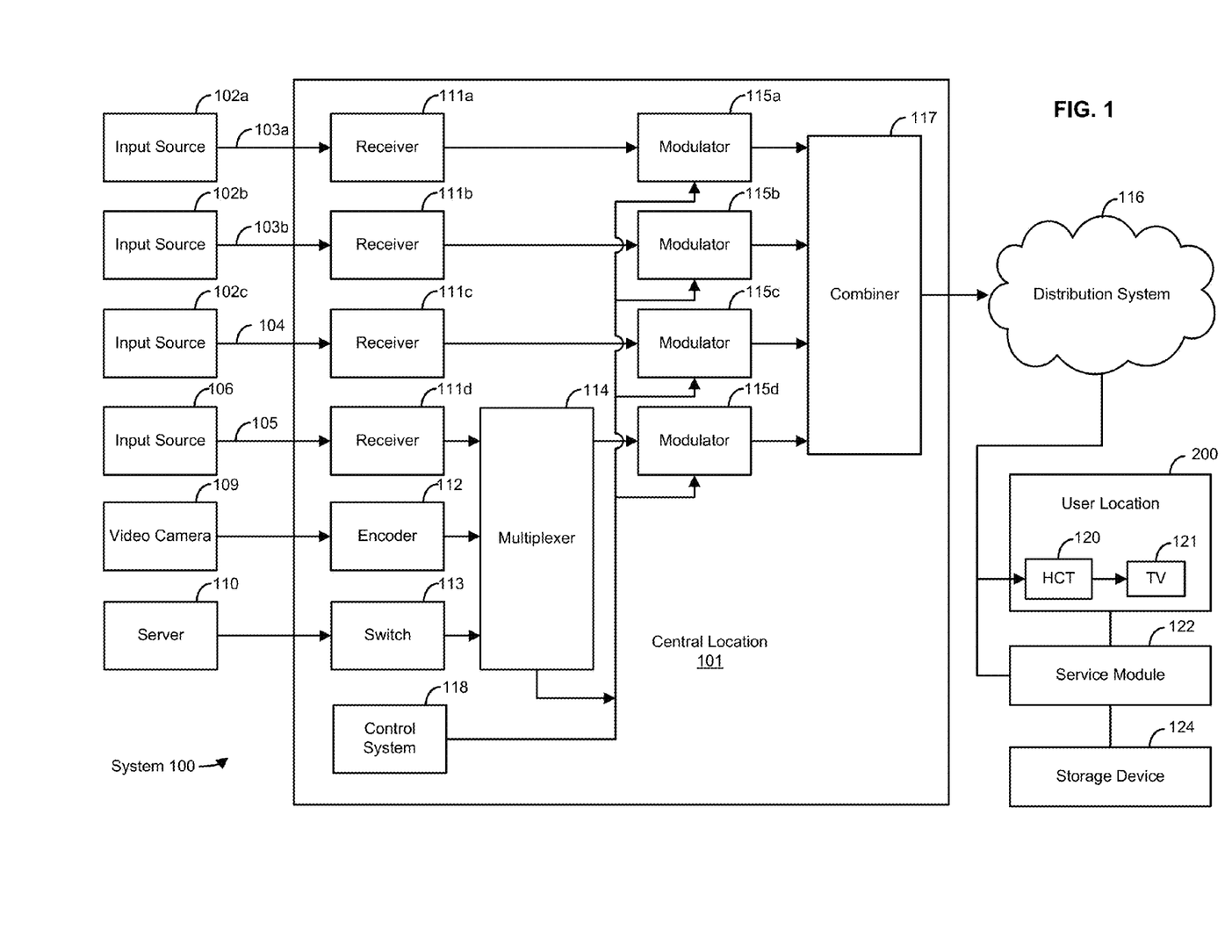
FIG. 1 is a block diagram of an exemplary system.

FIG. 1 illustrates various aspects of an exemplary system in which the present methods and systems can operate. The present disclosure relates to systems and methods for inferring a network topology. Those skilled in the art will appreciate that present methods may be used in systems that employ both digital and analog equipment. One skilled in the art will appreciate that provided herein is a functional description and that the respective functions can be performed by software, hardware, or a combination of software and hardware.

The system 100 can comprise a central location 101 (e.g., a central office or a headend), which can receive content (e.g., data, programming, and the like) from multiple sources. The central location 101 can combine the content from the various sources and can distribute the content to user (e.g., subscriber) locations (e.g., location 200) via distribution system 116.

In an aspect, the central location 101 can receive content from a variety of sources 102*a*, 102*b*, 102*c*. The content can be transmitted from the source to the central location 101 via a variety of transmission paths, including wireless (e.g., satellite paths 103*a*, 103*b*) and terrestrial path 104. The central location 101 can also receive content from a direct feed source 106 via a direct line 105. Other input sources can comprise capture devices such as a video camera 109 or a server 110. The signals provided by the content sources can include a single content item or a multiplex that includes several content items.

The central location 101 can comprise one or a plurality of receivers 111*a*, 111*b*, 111*c*, 111*d* that are each associated with an input source. For example, MPEG encoders such as encoder 112, are included for encoding local content or a video camera 109 feed. A switch 113 can provide access to server 110, which can be a Pay-Per-View server, a data server, a network (e.g., internet) router, a network system, a phone system, and the like. Some signals may require additional processing, such as signal multiplexing, prior to being modulated. Such multiplexing can be performed by multiplexer (mux) 114.

The central location 101, in one embodiment, can comprise one or a plurality of modulators, 115*a*, 115*b*, 115*c*, and 115*d*, for interfacing to the distribution system 116. The modulators can convert the received content into a modulated output signal suitable for transmission over the distribution system 116. The output signals from the modulators can be combined, using equipment such as a combiner 117, for input into the distribution system 116.

A control system 118 can permit a system operator to control and monitor the functions and performance of system 100. The control system 118 can interface, monitor, and/or control a variety of functions, including, but not limited to, the channel lineup for the television system, billing for each user, conditional access for content distributed to users, and the like. Control system 118 can provide input to the modulators for setting operating parameters, such as system specific MPEG table packet organization or conditional access information. The control system 118 can be located at central location 101 or at a remote location.

The distribution system 116 can distribute signals from the central location 101 to user locations, such as user location 200. The distribution system 116 can be an optical fiber network, a coaxial cable network, a hybrid fiber-coaxial network, a wireless network, a satellite system, a direct broadcast system, or any combination thereof. There can be a multitude of user locations connected to distribution system 116. At user location 200 a decoder 120, such as a gateway or home communications terminal (HCT) can decode, if needed, the signals for display on a display device, such as on a handheld device or television set (TV) 121 or a computer monitor. Those skilled in the art will appreciate that the signal can be decoded in or for a variety of equipment, including an HCT, a computer, a TV, a monitor, or satellite dish. In an exemplary aspect, the methods and systems disclosed can be located within, or performed on, one or more HCT's 120, TV's 121, central locations 101, DVR's, home theater PC's, and the like.

In an aspect, user location 200 is not fixed. By way of example, a user can receive content from the distribution system 116 on a mobile device such as a laptop computer, PDA, smartphone, GPS, vehicle entertainment system, portable media player, and the like. There can be a multitude of user locations connected to distribution system 116.

A service module 122 can be in communication with at least one of the user location 200, the distribution system 116, and the central location 101 to provide analysis, management, and service functions to one or more user locations 200, the distribution system 116, and the central location 101. In an aspect, the service module 122 can be configured to store and retrieve data from a storage device 124. It is understood that any storage device can be used such as a local storage device and a remote mass storage device, for example. As an example, the service module 122 can be configured to measure characteristics such as a transmit power of devices located at or associated with the user location 200, including devices such as a multimedia terminal adapter (MTA), a cable or optical modem, interface devices, terminals, a set-top box, or any other media device in communication with the distribution system 116. As a further example, the service module 122 can be located remotely from the user location 200 and can communicate with the devices at the user location 200 via the distribution system 116 or a separate communications link. The service module 122 can also be portable.

In an aspect, the methods and systems can utilize digital audio/video compression such as MPEG, or any other type of compression. The Moving Pictures Experts Group (MPEG) was established by the International Standards Organization (ISO) for the purpose of creating standards for digital audio/video compression. The MPEG experts created the MPEG-1 and MPEG-2 standards, with the MPEG-1 standard being a subset of the MPEG-2 standard. The combined MPEG-1, MPEG-2, and MPEG-4 standards are hereinafter referred to as MPEG. In an MPEG encoded transmission, content and other data are transmitted in packets, which collectively make up a transport stream. Additional information regarding transport stream packets, the composition of the transport stream, types of MPEG tables, and other aspects of the MPEG standards are described below. In an exemplary embodiment, the present methods and systems can employ transmission of MPEG packets. However, the present methods and systems are not so limited, and can be implemented using other types of transmission and data.

The output of a single MPEG audio and/or video coder is called a transport stream comprised of one or more elementary streams. An elementary stream is an endless near real-time signal. For convenience, the elementary stream may be broken into data blocks of manageable size, forming a packetized elementary stream (PES). These data blocks need header information to identify the start of the packets and must include time stamps because packetizing disrupts the time axis. For transmission and digital broadcasting, for example, several programs and their associated PESs can be multiplexed into a multi-program transport stream. A multi-program transport stream has a program clock reference (PCR) mechanism that allows transmission of multiple clocks, one of which is selected and regenerated at the decoder.

A multi-program transport stream is more than just a multiplex of audio and video PESs. In addition to the compressed audio, video and data, a transport stream includes metadata describing the bit stream. This includes the program association table (PAT) that lists every program in the multi-program transport stream. Each entry in the PAT points to a program map table (PMT) that lists the elementary streams making up each program. Some programs will be unencrypted, but some programs may be subject to conditional access (encryption) and this information is also carried in the metadata. The transport stream can be comprised of fixed-size data packets, for example, each containing 188 bytes. Each packet can carry a program identifier code (PID). Packets in the same elementary stream can all have the same PID, so that the decoder (or a demultiplexer) can select the elementary stream(s) it wants and reject the remainder. Packet continuity counts ensure that every packet that is needed to decode a stream is received. A synchronization system can be used so that decoders can correctly identify the beginning of each packet and deserialize the bit stream into words.

A content item, such as a program, can be a group of one or more PIDs that are related to each other. For instance, a multi-program transport stream used in digital television might contain three programs, to represent three television channels. Suppose each channel consists of one video stream, one or two audio streams, and any necessary metadata. A receiver wishing to tune to a particular "channel" merely has to decode the payload of the PIDs associated with its program. It can discard the contents of all other PIDs.

The multi-program transport stream carries many different programs and each may use a different compression factor and a bit rate that can change dynamically even though the overall bit rate stays constant. This behavior is called statistical multiplexing and it allows a program that is handling difficult material to borrow bandwidth from a program handling easy material. Each video PES can have a different number of audio and data PESs associated with it. Despite this flexibility, a decoder must be able to change from one program to the next and correctly select the appropriate audio and data channels. Some of the programs can be protected so that they can only be viewed by those who have paid a subscription or fee. The transport stream can comprise Conditional Access (CA) information to administer this protection. The transport stream can comprise Program Specific Information (PSI) to handle these tasks.

As described in greater detail below, a network topology at a user location can be determined using the systems and methods described herein. As an example, the network topology can comprise various components for processing and manipulating a signal.

Figure 2:
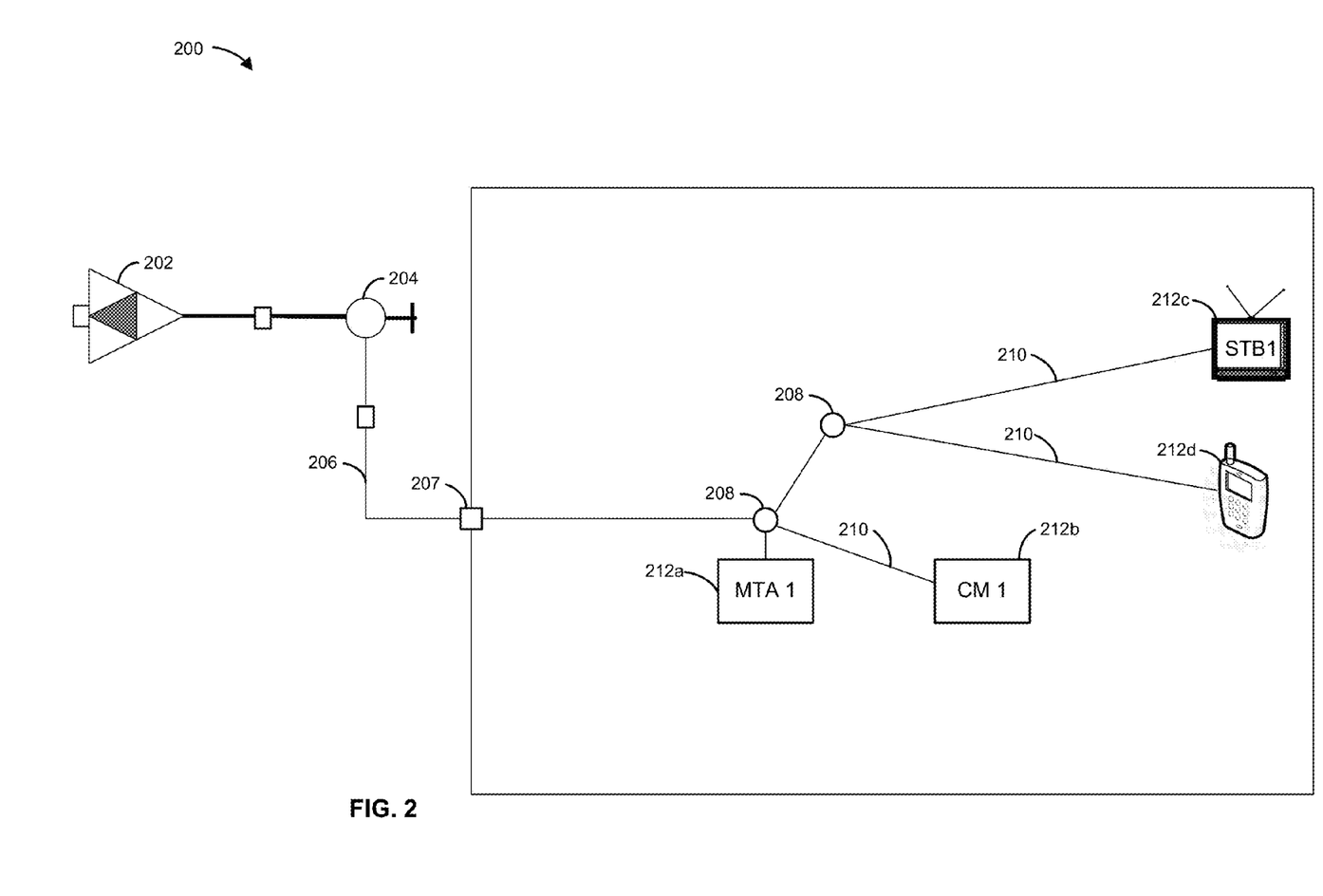
FIG. 2 is a schematic representation of an exemplary user location.

FIG. 2 illustrates an exemplary user location 200. As shown, in one embodiment, an amplifier 202 can be disposed in signal communication with the distribution system 116 to receive signals therefrom. In an aspect, the amplifier 202 can be a part of the distribution system 116. Any number of the amplifiers 202 and other signal processing devices can be interposed between the distribution system 116 and the user location 200. As an example, the amplifier 202 provides a pre-determined amplified input to a downstream component (e.g., output from the amplifier 202). As a further example, a value of the amplified input can be about 17 dBmV. In an aspect, a value of the amplified input can be between 16-18 dBmV. However, other values having other variances can be used.

A tap 204 can be in signal communication with the amplifier 202 to receive amplified signals, such as the amplified input, therefrom. As an example, the tap 204 can receive a signal directly from the distribution system 116. In an aspect, the tap 204 can provide an access point for "tapping" (e.g., accessing, capturing, analyzing, etc.) into the signals transmitted by the distribution system 116 for the particular user location 200. It is further understood that any number of taps 204 can be used for particular applications, such as a multiple unit dwellings, business applications, office buildings, warehouses, etc.

In an aspect, an amount of signal energy presented at the tap(s) 204 to a user can depend upon at least two factors, namely, the available signal energy at the tap 204 and a padding level (e.g., attenuation value of any pad, attenuator, coupler, or the like) of the tap 204. As an example, the padding level of the tap 204 can be adjusted by adding or removing attenuation devices such as pads, attenuators, and the like. However, other factors can be considered such as loss of signal power (e.g., insertion loss or through-put loss) resulting from the insertion of a device (e.g. the tap 204) in a transmission line or network. By way of example, the tap(s) 204 can be padded at 14, 20, 23, 26 or 29 dB below the signal level input in order to provide the proper signal attenuation to users who may be close or distant from a tap off unit and/or the central location 101. However, other padding levels and configurations can be used.

In an aspect, a drop line 206 (e.g., cable or wireless link) can be coupled to the tap 204 and routed into a physical structure such as the user's home or business to provide a flow path for the signals received from the distribution system 116. As an example, the drop line 206 can have a length of 400 feet with an attenuation of −1.0 dBmV per 100 feet of length. Accordingly, the drop line 206 can have a drop loss of −4.0 dBmV.

In an aspect, a ground block 207 can be coupled to the drop line 206 downstream from the tap 204. Typically, the ground block 207 has a low through-put loss of signal (e.g., insertion loss) or signal attenuation and is not usually figured into an attenuation calculation. However, any insertion loss due to the ground block 207 can be included in the appropriate calculations described in further detail herein.

A splitter or plurality of splitters 208 can be disposed in or near a physical structure at the user location 200 to create a premises distribution topology to send/receive signals throughout various locations in the home or business. As an example, a first one of the splitters 208 can be coupled to the tap 204 by the drop line 206. As a further example, a first one of the splitters 208 can be coupled directly to the ground block 207. In an aspect, each of the splitters 208 can have an attenuation factor inherently associated therewith. For example, the following table provides exemplary attenuation values for particular types of the splitters 208:

| Splitter Type | Typical Attenuation |
| --- | --- |
| 2 way splitter | −4 dBmV |
| 3 way unbalanced splitter | −4, −4, −7 dBmV |
| 3 way balanced splitter | −5.5, −5.5, −5.5 dBmV |
| 4 way splitter | −7 dBmV |
| 8 way splitter | −11 dBmV |

It is understood that any splitter or similar device having any attenuation can be used without departing from the spirit of the present disclosure. One skilled in the art would understand that various configurations of the splitters 208 can be used to support the distribution requirements of any particular location or premises.

A plurality of premises lines 210, such as wireless links or cables, can be coupled to the first one of the splitters 208 to distribute the signals from the drop line 206 through the user location 200. In an aspect, each of the premises lines 210 can have an attenuation factor inherently associated therewith. For example, the following table provides exemplary attenuation values for particular lengths of the premises lines 210 as well as other devices that may be coupled to the premises lines 210:

| Component | Typical Attenuation |
| --- | --- |
| 100' RG6 coaxial | −1.25 dBmV |
| DOCSIS Equalizer (NMTER = 1): | −1 dBmV |
| In-Home Amplifier | −1 dBmV |

It is understood that any premises lines or cables having any attenuation can be used without departing from the spirit of the present disclosure. One skilled in the art would understand that various configurations of the premises lines 210 can be used to support the distribution requirements of any particular location or premises.

In an aspect, other splitters 208 or devices 212 can be coupled to the premises lines 210 to receive the signals therefrom. Accordingly, the devices 212 in the user location 200 can be connected to the distribution system 116 through the tap 204. As an example, the connected devices 212 can include a multimedia terminal adapter (MTA) 212a, a cable or optical modem 212b, a terminal such as a set-top box (STB) 212c, a mobile device such as a smart phone 212d, or other device in communication with the tap 204. As a further example, the devices 212 can include in-home devices, user devices, and systems configured to receive signals from at least one of the distribution system 116 and the central location 101. It is understood that the configuration and interconnection of at least the splitters 208, the premises lines 210, and the devices 212 can represent a network topology for the particular user location 200.

Figure 3:
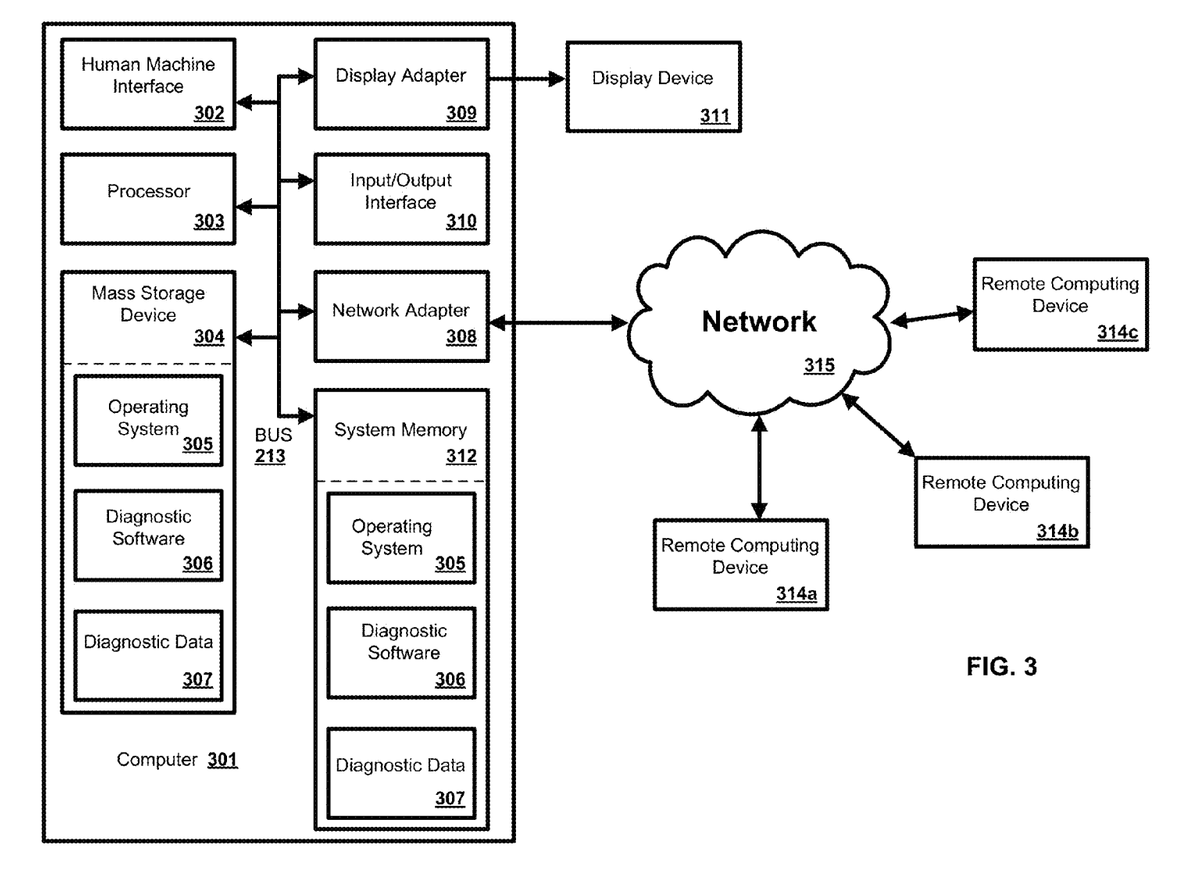
FIG. 3 is a block diagram of an exemplary computing device.

In an exemplary aspect, the methods and systems can be implemented on a computing device such as a computer 301 as illustrated in FIG. 3 and described below. By way of example, service module 124 of FIG. 1 can be a computer as illustrated in FIG. 3. Similarly, the methods and systems disclosed can utilize one or more computers to perform one or more functions in one or more locations. FIG. 3 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 301. The components of the computer 301 can comprise, but are not limited to, one or more processors or processing units 303, a system memory 312, and a system bus 313 that couples various system components including the processor 303 to the system memory 312. In the case of multiple processing units 303, the system can utilize parallel computing.

The system bus 313 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 313, and all buses specified in this description can also be implemented over a wired or wireless network connection and each of the subsystems, including the processor 303, a mass storage device 304, an operating system 305, a diagnostic software 306, a diagnostic data 307, a network adapter 308, system memory 312, an Input/Output Interface 310, a display adapter 309, a display device 311, and a human machine interface 302, can be contained within one or more remote computing devices 314a,b,c at physically separate locations, connected through buses of this form, in effect implementing a fully distributed system.

The computer 301 typically comprises a variety of computer readable media. Exemplary readable media can be any available media that is accessible by the computer 301 and comprises, for example and not meant to be limiting, both volatile and non-volatile media, removable and non-removable media. The system memory 312 comprises computer readable media in the form of volatile memory, such as random access memory (RAM), and/or non-volatile memory, such as read only memory (ROM). The system memory 312 typically contains data such as diagnostic data 307 and/or program modules such as operating system 305 and diagnostic software 306 that are immediately accessible to and/or are presently operated on by the processing unit 303.

In another aspect, the computer 301 can also comprise other removable/non-removable, volatile/non-volatile computer storage media. By way of example, FIG. 3 illustrates a mass storage device 304 which can provide non-volatile storage of computer code, computer readable instructions, data structures, program modules, and other data for the computer 301. For example and not meant to be limiting, a mass storage device 304 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 304, including by way of example, an operating system 305 and diagnostic software 306. Each of the operating system 305 and diagnostic software 306 (or some combination thereof) can comprise elements of the programming and the diagnostic software 306. Diagnostic data 307 can also be stored on the mass storage device 304. Diagnostic data 307 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 301 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 303 via a human machine interface 302 that is coupled to the system bus 313, but can be connected by other interface and bus structures, such as a parallel port, game port, an IEEE 1394 Port (also known as a Firewire port), a serial port, or a universal serial bus (USB).

In yet another aspect, a display device 311 can also be connected to the system bus 313 via an interface, such as a display adapter 309. It is contemplated that the computer 301 can have more than one display adapter 309 and the computer 301 can have more than one display device 311. For example, a display device can be a monitor, an LCD (Liquid Crystal Display), or a projector. In addition to the display device 311, other output peripheral devices can comprise components such as speakers (not shown) and a printer (not shown) which can be connected to the computer 301 via Input/Output Interface 310. Any step and/or result of the methods can be output in any form to an output device. Such output can be any form of visual representation, including, but not limited to, textual, graphical, animation, audio, tactile, and the like. The display 211 and computer 201 can be part of one device, or separate devices.

The computer 301 can operate in a networked environment using logical connections to one or more remote computing devices 314a,b,c. By way of example, a remote computing device can be a personal computer, portable computer, smartphone, a server, a router, a network computer, a peer device or other common network node, and so on. Logical connections between the computer 301 and a remote computing device 314a,b,c can be made via a network 315, such as a local area network (LAN) and a general wide area network (WAN). Such network connections can be through a network adapter 308. A network adapter 308 can be implemented in both wired and wireless environments. Such networking environments are conventional and commonplace in dwellings, offices, enterprise-wide computer networks, intranets, and the Internet.

For purposes of illustration, application programs and other executable program components such as the operating system 305 are illustrated herein as discrete blocks, although it is recognized that such programs and components reside at various times in different storage components of the computing device 301, and are executed by the data processor(s) of the computer. An implementation of diagnostic software 306 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

As described in greater detail below, provided are methods for determining/inferring a network topology for a particular user location. As an example, the network topology can identify an interconnection of various components for processing, routing, and/or manipulating a signal. In respect of the methods disclosed, the steps presented are exemplary in nature, and thus, the order of the steps is not necessary or critical. Accordingly, the order of the steps of the methods can be altered and steps can be added and/or omitted.

Figure 4:
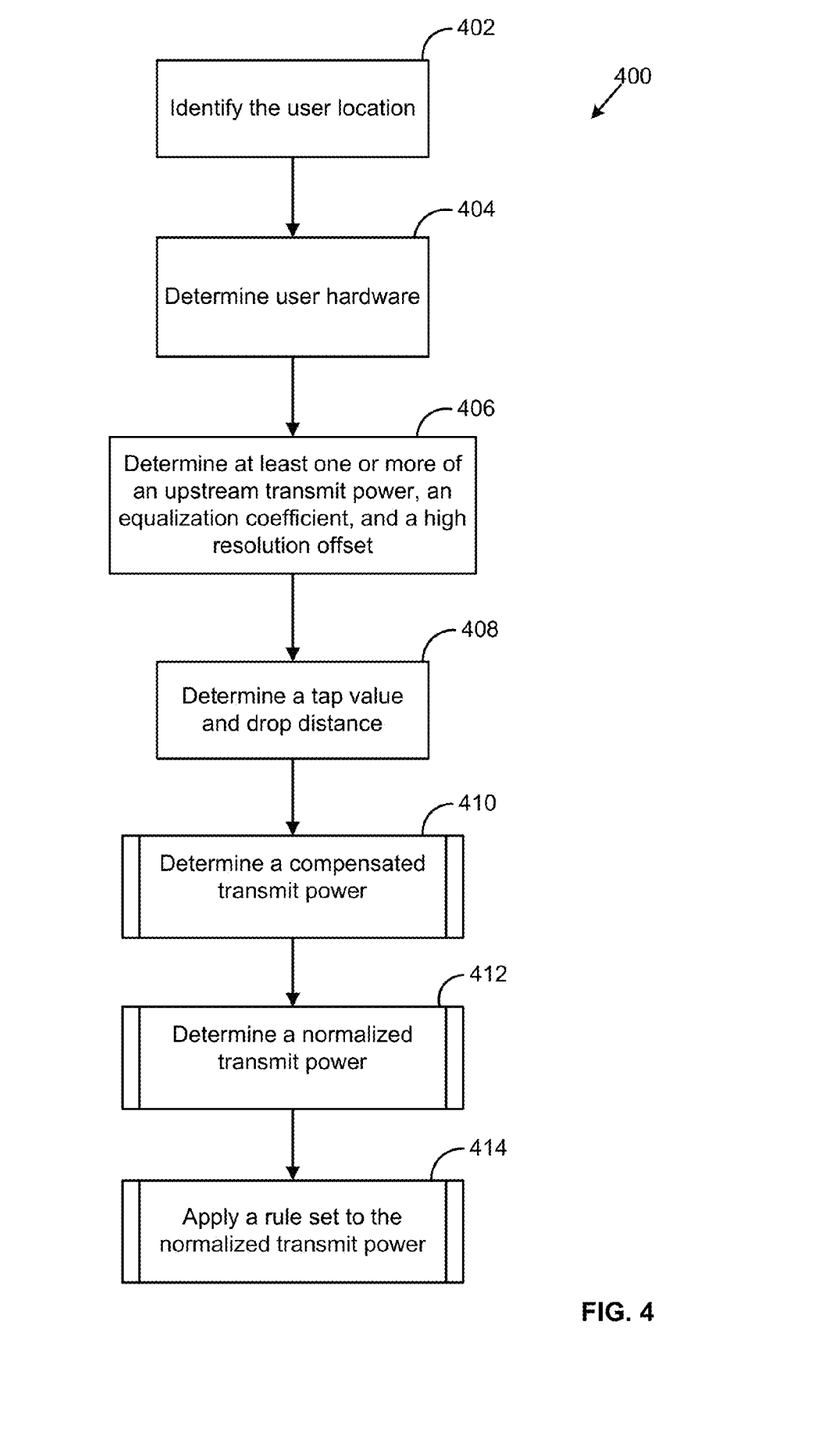
FIG. 4 is a flow chart of an exemplary method.

FIG. 4 illustrates a method 400 for inferring a network topology. The method illustrated in FIG. 4 will be discussed in reference to FIGS. 1-3, but is not so limited. In step 402, the user location 200 for a particular user or customer can be identified by a unique key (e.g., identifier) such as account number, an account information, a MAC address, a GPS location, a telephone number, or the like. It is understood that any identifier can be associated with the user location 200. As an example, the identifier can be retrieved from a storage device such as storage device 126. As a further example, the identifier can be retrieved in real-time by the service module 124. It is understood that the identifier can be associated with the user location 200 in any manner and can be retrieved by any means.

In step 404, a user/customer hardware including devices 212 can be determined based upon the unique key/identifier. As an example, a database of the hardware assigned to the user location 200 by a provider can be accessed to retrieve an equipment list. Also, devices added to a home network by a user can be identified via user registration or other discovery techniques or tools. As a further example, the hardware can be identified in real-time by an on-site technician or by remote means. It is understood that the hardware can comprise any number of devices such as the devices 212, and/or any other user devices or devices provided by an operator or service provider.

In step 406, each of the devices 212 can be interrogated or queried for at least one or more of an upstream transmit power, equalization coefficients, and a high-resolution timing offset value. As an example, the service module 124 can communicate with each of the devices 212 in order to measure or retrieve the at least one or more of an upstream transmit power, equalization coefficients, and a high-resolution timing offset value. As a further example, the devices 212 can be queried locally by an individual at the user location 200. In an aspect, previously collected data may be retrieved in place of a direct query of the devices 212.

In step 408, a tap value and drop distance for the particular user location 200 can be determined. As an example, the tap value and drop distance can be retrieved from a previously stored record. In an aspect, an outside plant topology can be recorded during installation and stored in a warehouse or an electronic storage device. As an example, the tap value can be the padding value associated with a particular tap 204. As a further example, the record of the outside plant topology can include a designated tap value for the user location 200 and a measured distance to the ground block 207. In an aspect, the measured distance can be used to calculate an attenuation value for the communication link spanning from the tap 204 to the ground block 207. As a further example, the record of the outside plant topology can be used to determine a premise tap value and a drop distance to the ground block 207. In an aspect, a target value for the nearest return path amplifier input can be included in the record and subsequently retrieved. As an example, the target value can be calculated based upon onsite measurements.

Figure 5:
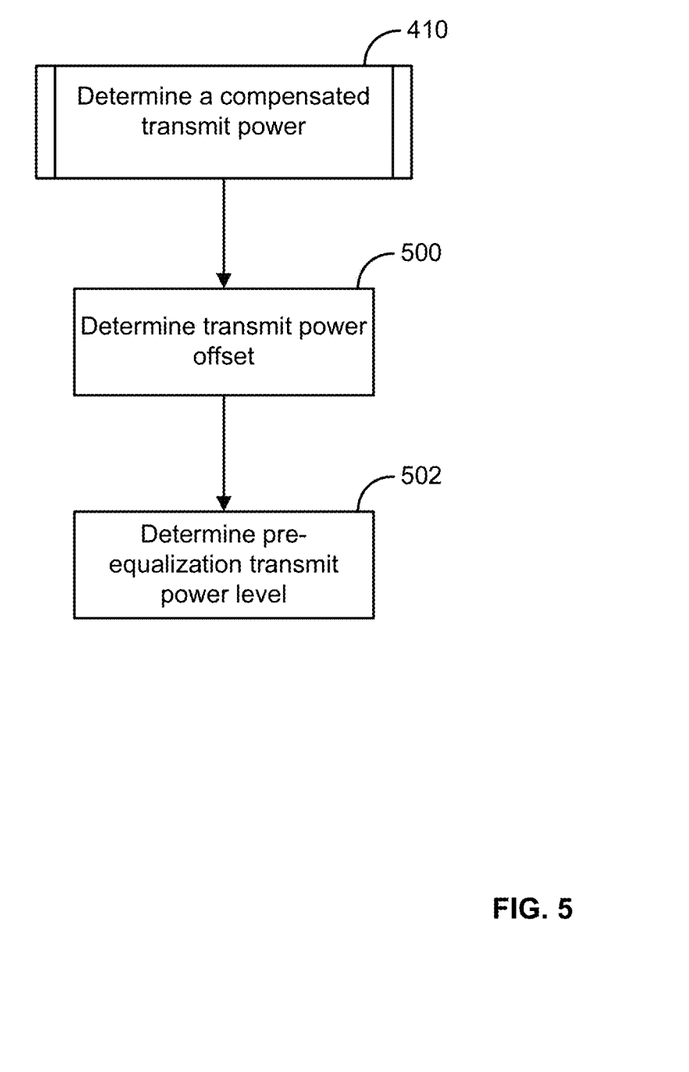
FIG. 5 is a flow chart of an exemplary method of determining a compensated transmit power.

In step 410, a compensated transmit power value can be determined for each of the devices 212 identified in step 404. As an example, the compensated transmit power value is determined based upon a measured transmit power value and a return loss for each of the devices 212. As a further example, the compensated transmit power value for a device (e.g., a DOCSIS device in one type of network) can be determined using a subroutine, as illustrated in FIG. 5.

At step 500, a transmit power offset can be determined to correctly factor the effect of pre-equalization. In an aspect, the transmit power offset can be based upon a Non-Main Tap to Total Energy Ratio (NMTER), which can be derived from adaptive equalization coefficient values, as follows:

$$NMTER = 10 \text{ Log}\left(\frac{PreMTE + PostMTE}{TTE}\right)$$

The pre-main tap energy (PreMTE), which can be the summation of the energy in all equalizer taps prior to the main adaptive equalizer tap, can be determined by the sum of the squares of the real (FnR) and imaginary (Fni) components of the equalization coefficient used in timing offset. For example, the pre-main tap energy, assuming a main tap in the eighth position, can be defined as:

$$PreMTE = F1_R^2 + F1_i^2 + F2_R^2 + F2_i^2 + F3_R^2 + F3_i^2 + \ldots + F7_R^2 + F7_i^2$$

The post-main tap energy (PostMTE) can be the summation of the energy in all equalizer taps after the main tap. The post-main tap energy, assuming a main tap in the eighth position, can be defined as:

$$PostMTE = F9_R^2 + F9_i^2 + F10_R^2 + F10_i^2 + \ldots + F24_R^2 + F24_i^2$$

The total tap energy (TTE), which can be the summation of the energy in all equalizer taps, can be defined as:

TTE = PreMTE + MTE + PostMTE

The main tap energy (MTE) assuming the eighth position, can be defined as:

$$MTE = F8_R^2 + F8_i^2$$

For example, in one type of network, the adaptive equalizer main tap in DOCSIS 2.0 is typically in tap position eight. However, in such example network, certain cable modem termination system (CMTS) implementations can dispose the adaptive equalizer main tap in as low as the sixth position. It is further understood that in DOCSIS 1.1 the main tap is in the fourth position. However, other tap positions can be used. Other formulas and pre-equalization settings can be used and evaluated.

In an aspect, the NMTER value provides insight to any additional transmit power added to compensate for linear distortions. Accordingly, the NMTER can be used as the transmit power offset to determine the compensated transmit value for each of the devices 212.

In an aspect, a return path loss for legacy video devices can be determined from a direct measurement of transmit power (including automatic gain control (AGC) data, where available). As a further example, the following formula can be used to calculate timing offsets in legacy video devices:

$$\left(\frac{6.25 \text{ microseconds}}{2}\right) * V_{oP} = \text{Distance over coaxial cable},$$

wherein, Vop is the velocity of propagation.

In step 502, a pre-equalized transmit power level of each device is determined using the previously calculated offset value. For example, the measured transmit power level less the NMTER can provide the pre-equalized transmit power level for each device 212. As an example, the pre-equalized transmit power level for each device 212 can be defined as a compensated transmit power value.

In an aspect, the equalization coefficients can be evaluated for each device to determine near-in tap energy distribution. As an example, a tap energy value can be used for a first post-main tap with peak energy distribution. As a further example, each equalization tap past main can be calculated based upon:

$$\left(\frac{T}{\text{symbol period}}\right) * V_{oP} = \text{Distance over coaxial cable},$$

wherein T is the delay tap spacing and the symbol period is the periodicity of a single symbol calculated from the symbol rate In an aspect, each of the equalization coefficients (FFT) can be evaluated for common frequency response signatures. As an example, in channel frequency response (ICFR Ripples) can be evaluated to determine frequency domain, a post Main tap max energy can be evaluated for time domain, and pre main tap max energy can be evaluated to identify group delay caused by in-home amplifiers, for example. Other processes can be applied to the equalization coefficients in order to support diagnostics, or the like, of the devices 212.

In an aspect, a High-Resolution timing offset can be evaluated to determine distance deltas. As an example, the following formula can be applied to each device:

$$(6.25 \text{ microseconds}/(64*256)/2) * V_{oP} = \text{Distance over coaxial cable},$$

wherein the formula can be based upon DOCSIS IF2 and IF3 specification, for example.

Returning to FIG. 4, a normalized transmit power can be calculated for each of the devices 212, at step 412. As an example, the normalized transmit power can be determined using a subroutine, as illustrated in FIG. 6.

Figure 6:
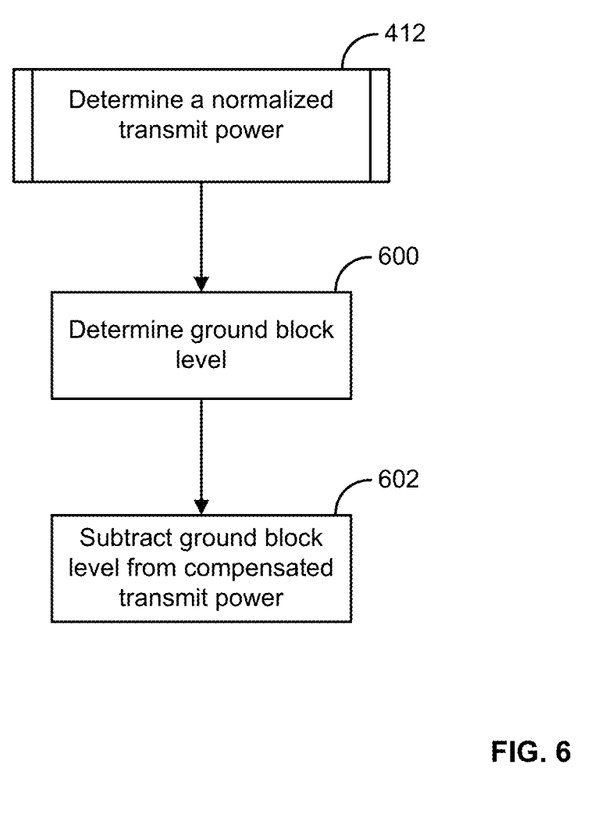
FIG. 6 is a flow chart of an exemplary method of determining a normalized transmit power.

Turning to FIG. 6, in step 600, an ideal ground block level can be calculated in the following manner: ground block level is equal to the sum of an input value of the amplifier 202 (e.g. 17 dBmV), any hardline/bridger/coupler or other insertion loss (e.g. 0 dBmV), the tap pad value (e.g. 23 dBmV), and any drop loss (e.g. 4 dBmV).

In step 602, the ground block level is subtracted from the compensated transmit power value calculated in step 410 for each of the devices 212. As an example, a ground block level of 44 dBmV can be subtracted from the compensated transmit power value (51 dBmV) of the MTA 212a resulting in a normalized transmit power value of 7 dBmV. As a further example a ground block level of 44 dBmV can be subtracted from the compensated transmit power value (51 dBmV) of the cable modem 212b resulting in a normalized transmit power value of 7 dBmV. As a further example a ground block level of 44 dBmV can be subtracted from the compensated transmit power value (56 dBmV) of the STB 212c resulting in a normalized transmit power value of 12 dBmV.

Returning to FIG. 4, in step 414, a dynamic rule-set can be applied to the normalized transmit power values of the devices 212 to create a network topology inference. As an example, an exemplary rule-set is illustrated in FIG. 7.

Figure 7:
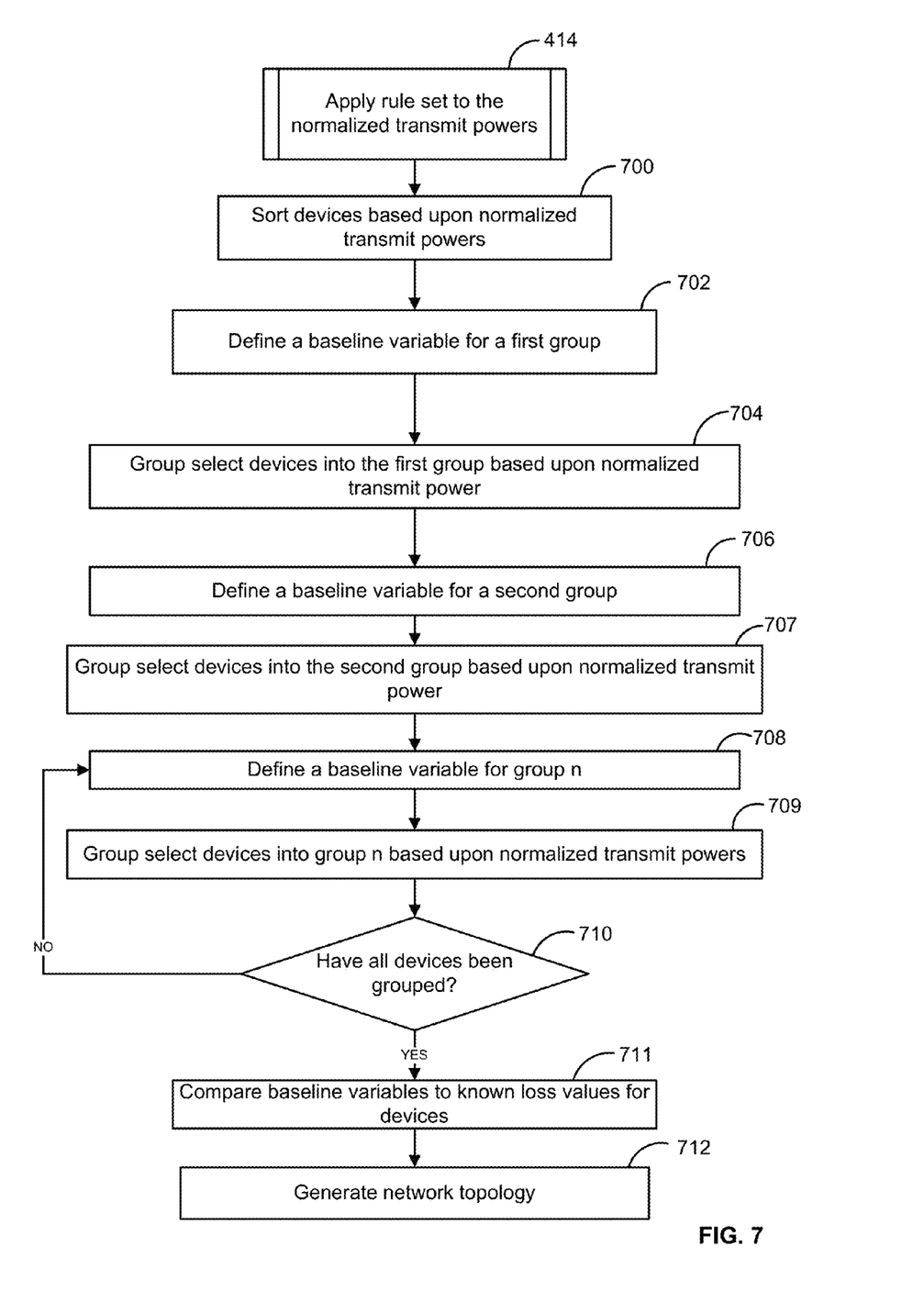
FIG. 7 is a flow chart of an exemplary rule set.

Turning to FIG. 7, in step 700, the normalized transmit power for each of the devices 212 in the user location 200 can be sorted or sequenced. As an example, the devices 212 are sorted from lowest normalized transmit power value to highest normalized transmit power value. It is understood that the device(s) 212 with the lowest transmit power can be electronically closest to the tap 204.

In step 702, the first normalized transmit power value in the sorted list (e.g. the lowest value) can be stored as a baseline variable (e.g. BTXg1=Base Transmit Power group 1) for a first group or first level of the devices 212 in the network topology.

In step 704, the sorted list can be sequentially processed to locate a normalized transmit power value that is greater than (BTXg1 +variance). As an example, variance can be about 2.5 dBmV based upon a maximum amount of variance expected between the devices 212 with the same splitter configuration. It is understood that the variance can be caused by a cable length, cable coupler, and/or connection points, for example. It is further understood that other variances can be used. Each of the devices 212 having a normalized transmit power value less than or equal to (BTXg1+variance) are grouped into the first group. Accordingly, it is inferred that each of the devices 212 in the first group are directly coupled to the same one of the splitters 208.

In step 706, the first normalized transmit power value in the sorted list that is greater than (BTXg1+variance) can be stored as a baseline variable (e.g. BTXg2=Base Transmit Power group 2) for a second group or second level of devices 212 in the network topology.

In step 707, the sorted list can be sequentially processed to locate a normalized transmit power value that is greater than (BTXg2+variance). As an example, variance can be about 2.5 dBmV. Each of the devices 212 having a normalized transmit power value less than or equal to (BTXg2+variance) and greater than (BTXg1+variance) are grouped into the second group. Accordingly, it can be inferred that each of the devices 212 in the second group are directly coupled to the same one of the splitters 208.

In step 708, the first normalized transmit power value in the sorted list that is greater than (BTXg2+variance) can be stored as a baseline variable (e.g. BTXgn=Base Transmit Power group n) for up to 'n' groups of devices 212 in the network topology. In step 709, an iterative process similar to the process discussed for steps 704 and 707 can be executed to define the devices 212 belong to group n. At step 710, the grouping process can continue until each of the devices 212 are grouped.

In step 711, each of the baseline variables can be compared to a presumed loss value for known devices such as attenuation values for splitters 208. Where a group baseline variable (BTXgx−BTXgn) substantially matches a known loss value of a particular device, the particular device is stored in a topology. As an example, for a group baseline variable that is equal to 4 dBmV, it can be inferred that each of the devices 212 in the associated group is coupled to a two-way splitter having an attenuation of about −4 DBmV. It is understood that a number of the devices 212 in a particular group can be considered when determining properties of any intervening splitters 208 or other devices. For example, a group having three of the devices 212 can be associated with at least a 3 or 4 way splitter. In an aspect, each of the normalized transmit power values of the devices 212 belonging to a particular group can be averaged and compared to known loss values.

In step 712, each of the normalized transmit power values and baseline variables can be analyzed to generate a network topology for the user location 200. Accordingly, once the network topology is complete the topology can be used in diagnostics and troubleshooting. For example, any of the devices 212 that have impairments detected by an equalizer data analysis can be identified in the topology. If multiple devices 212 have issues on the same splitter 208, the particular splitter 208 can be serviced by checking the upstream connection on the splitter, replacing the splitter, or checking the cable span upstream of the splitter 208, for example. If one device 212 in a particular group has an issue and another device 212 in the group is operating within normal parameters on the same splitter, the device 212 can be serviced by checking the downstream connection from the splitter 208 to the troubled device 212, for example. It is understood that the topology can be relied upon for any application or service.

Figure 8:
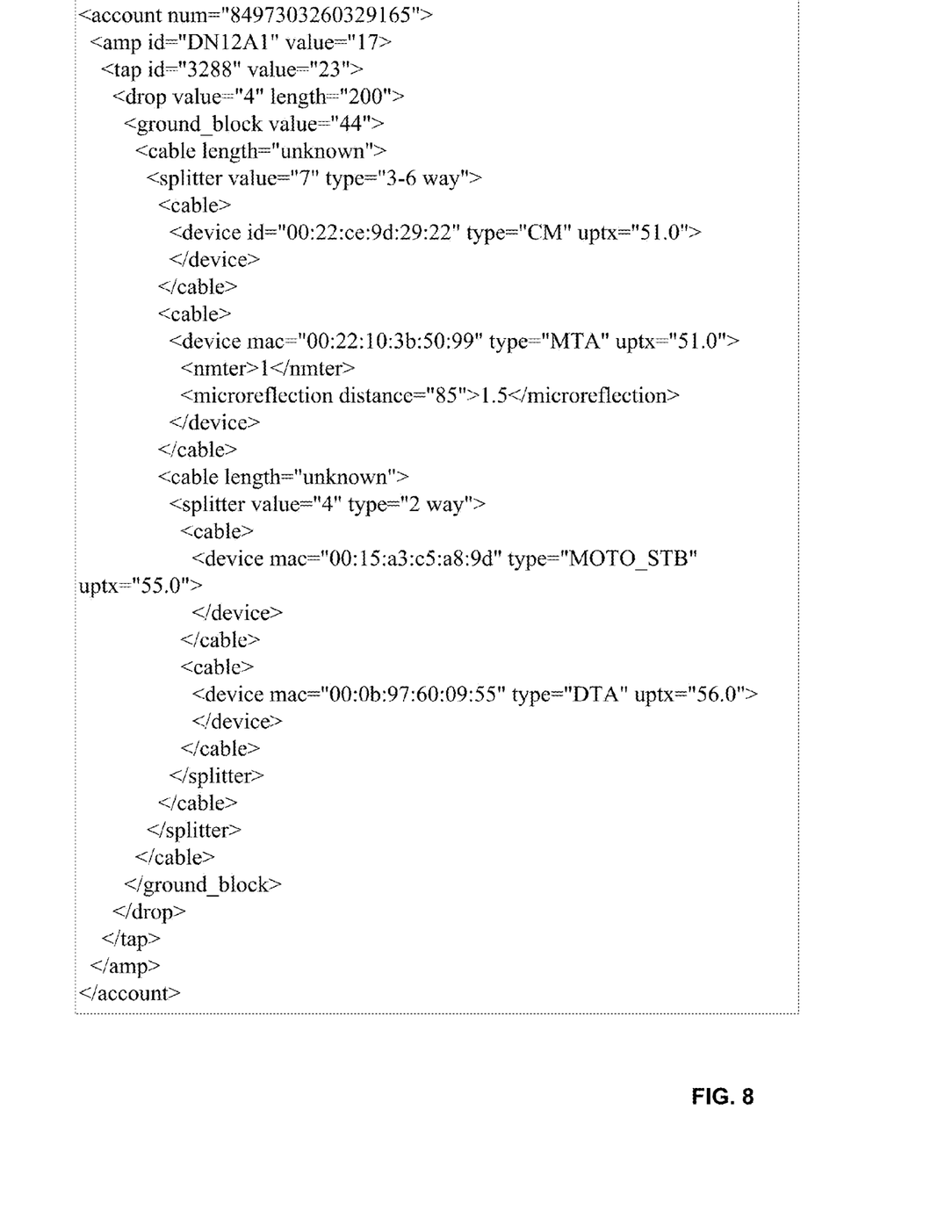
FIG. 8 is an exemplary hierarchal rendering of a network topology.

In an aspect, the inferred network topology can be rendered in a hierarchical manner such as XML, as shown in FIG. 8.

Graphic representation may also be displayed. As a non-limiting example, data representing the inferred network topology can also contain performance information that describes specific faults which can be associated to elements in that hierarchy, such as:

```
<device mac="00:22:10:3b:50:99" type="MTA" uptx="51.0">
    <nmter>1</nmter>
    <microreflection distance="less than 85 feet">1.5</microreflection>
</device>;
``` wherein, a single wiring problem between the MTA and first splitter is identified in the home and can likely be attributed to a loose connector or damaged/crimped coaxial cable.

As described in greater detail below, systems and methods are provided to determine a network topology for a particular user location. As an example, the network topology can be used in diagnostic operation, troubleshooting, and remote analysis.

Figure 9:
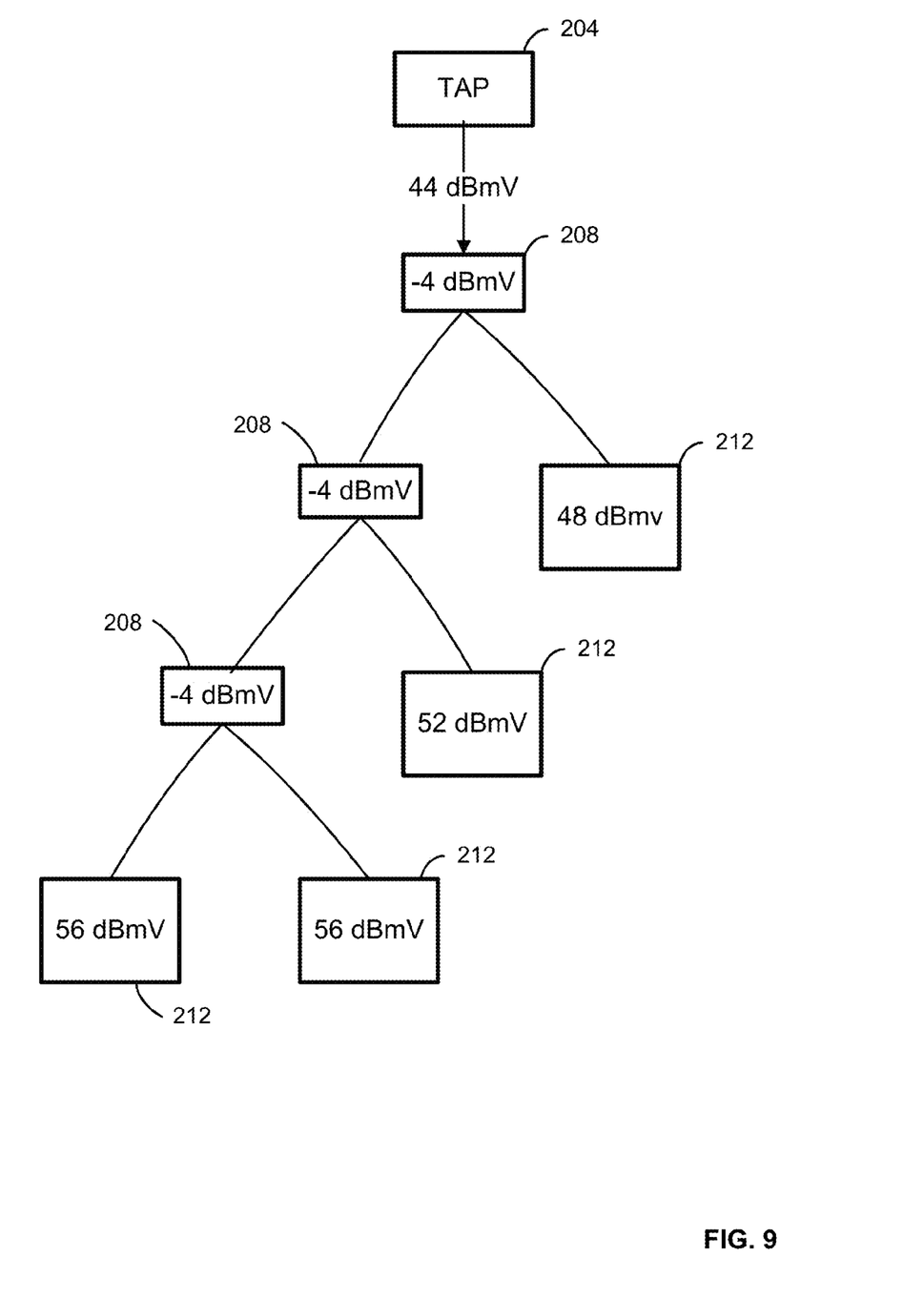
FIG. 9 is an exemplary rendering of a network topology.

FIG. 9 illustrates an exemplary network topology for a user premises having a ground block level of 44 dBmV. As shown, a compensated transmit power value is illustrated for each of the devices 212. Based upon the processes described in reference to FIGS. 4-8, a normalized transmit power value can be calculated, sorted, and processed in order to identify the intervening elements between the tap 204 and each of the devices 212.

As shown, the lowest value of the compensated transmit power values is 48 dBmV. Accordingly, the device 212 associated with the 48 dBmV compensated transmit power value can be included in a first group or a first tier of devices. Since the compensated transmit power value of the device 212 is the first group is greater than the ground block level, it can be inferred that an intervening device is disposed between the device 212 of the first group and the tap 204. Following the processes set forth herein, another of devices 212 having a compensated transmit power value of 52 dBmV can be grouped into a second group, since the compensated transmit power value is greater than the compensated transmit power value of the device 212 in the first group, thereby indicating that another intervening device may be disposed between the tap 204 and the device 212 of the second group. Accordingly, a pair of the devices 212 having compensated transmit power values of 56 dBmV can be grouped into a third group, since the compensated transmit values of the devices 212 in the third group are greater than the compensated transmit values of the device 212 in the second group.

Since the compensated transmit power value of the devices 212 is not substantially equal to the ground block level, it can be inferred that an intervening device is disposed between the tap 204 and the device 212. In an aspect, by subtracting the ground block level of 44 dBmV from the compensated transmit power value of 48 dBmV of the device 212 of the first group, it can be determined that an intervening device has a loss value of −4 dBmV (48 dBmV−44 dBmV=4 dBmV). Since the device 212 is in the first group, it can be inferred that the intervening device is the only disposed 208 between the tap 204 and the device 212 of the first group. Accordingly, the loss value of the intervening device can be compared to known loss values to identify the intervening device. As an example, a loss value of 4 dBmV can be due to a 2-way splitter.

It can also be inferred that the device 212 belonging to the second group has at least two intervening splitters 208 between the tap 204 and the device 212 belonging to the second group. By subtracting the ground block level of 44 dBmV from the compensated transmit power value of 52 dBmV for the device 212 of the second group, it is determined that an intervening device(s) has/have a loss value of −8 dBmV (such as two two-way splitter). Since the splitter 208 nearest the tap 204 was determined to be a two-way splitter with −4 dBmV attenuation, it can be inferred that the next level splitter 208 is a two-way splitter having −4 dBmV attenuation, thereby resulting in a cumulative loss of −8 dBmV.

It can also be inferred that the devices 212 belonging to the third group have at least three intervening splitters 208 between the tap 204 and the devices 212 belonging to the third group. By subtracting the ground block level of 44 dBmV from the compensated transmit power value of 56 dBmV for the devices 212 of the third group, it is determined that intervening devices have a loss value of −12 dBmV (such as three two-way splitter). Since the splitter 208 nearest the tap 204 and the next level splitter were each determined to be a two-way splitter with −4 dBmV attenuation, it can be inferred that the next level splitter 208 is a two-way splitter having −4 dBmV attenuation, thereby resulting in a cumulative loss of −12 dBmV.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method, comprising:
   determining, by a computing device, a transmit power entering a network comprising a first communication device, wherein the first communication device is configured to receive content from a content distribution system;
   determining, by the computing device, a normalized transmit power of the first communication device, wherein the normalized transmit power is determined based on the transmit power;
   identifying, by the computing device, a distribution device in the network by comparing a loss value of the distribution device to the normalized transmit power of the first communication device; and
   determining, by the computing device, a topology of the network comprising the first communication device and the distribution device based on at least one of the normalized transmit power of the first communication device and the loss value of the distribution device.

2. The method of claim 1, wherein the distribution device is a splitter and the topology of the network is a wiring topology.

3. A system comprising:
   a computing device, in signal communication with a first communication device, adapted to measure a characteristic comprising transmit power of the first communication device; and
   a processor in communication with the computing device, the processor configured to:
   determine a transmit power entering a network comprising the first communication device, wherein the first communication device is configured to receive content from a content distribution system;
   determine a normalized transmit power of the first communication device, wherein the normalized transmit power is based on the transmit power;
   identify a distribution device in the network by comparing a loss value of the distribution device to the normalized transmit power of the first communication device; and
   determine a topology of the network comprising the first communication device and the distribution device based on at least one of the normalized transmit power of the first communication device and the loss value of the distribution device.

4. The system of claim 3, wherein the distribution device is a splitter and the topology of the network is a wiring topology.

5. A method, comprising:
   determining, by a computing device, a transmit power entering a network comprising at least one of a first communication device and a second communication device, wherein the first communication device and the second communication device are configured to receive content from a content distribution system;
   determining, by the computing device, a first path based on a first normalized transmit power associated with the first communication device;
   determining, by the computing device, a second path based on a second normalized transmit power associated with the second communication device, wherein at least one of the first normalized transmit power and the second normalized transmit power is based on the transmit power;
   comparing, by the computing device, at least one of the first normalized transmit power and the second normalized transmit power to at least one parameter, wherein the at least one parameter comprises a loss value; and
   determining, by the computing device, a topology of the network based on the comparison, wherein the topology of the network is indicative of the first path and the second path.

6. The method of claim 5, wherein the at least one parameter is indicative of the presence of at least one splitter in the topology of the network.

7. The method of claim 5, wherein determining the first path based on the first normalized transmit power associated with the first communication device comprises subtracting the loss value from the first normalized transmit power.

8. The method of claim 5, wherein determining the topology of the network comprises determining a relationship between the first path and the second path based on the comparison.

9. The method of claim 1, further comprising, determining the network from a plurality of networks by an identifier.

10. The method of claim 1, further comprising:
 detecting an impairment in at least the first communication device; and
 recommending service to a portion of the network upstream of the first communication device based on the impairment and the topology of the network.

11. The method of claim 10, further comprising, servicing the portion of the network upstream of the first communication device.

12. The method of claim 1, further comprising:
 detecting a first impairment in the first communication device;
 detecting a second impairment in a second communication device, wherein the first communication device and the second communication device are downstream of the distribution device; and
 recommending service to one or more of the distribution device and a portion of the network upstream of the distribution device based on the topology of the network, the first impairment, and the second impairment.

13. The method of claim 1, further comprising:
 detecting an impairment in the first communication device;
 determining a second communication device is functioning properly, wherein the first communication device and the second communication device are downstream of the distribution device; and
 recommending service to a portion of the network downstream of the distribution device and upstream of the first communication device based on the topology of the network and the impairment.

14. The system of claim 3, wherein the processor is further configured to:
 detect an impairment in at least the first communication device; and
 recommend service to a portion of the network upstream of the first communication device based on the impairment and the topology of the network.

15. The method of claim 14, wherein the processor is further configured to service the portion of the network upstream of the first communication device.

16. The system of claim 3, wherein the processor is further configured to:
 detect a first impairment in the first communication device;
 detect a second impairment in a second communication device, wherein the first communication device and the second communication device are downstream of the distribution device; and
 recommending service to one or more of the distribution device and a portion of the network upstream of the distribution device based on the topology of the network, the first impairment, and the second impairment.

17. The system of claim 3, wherein the processor is further configured to:
 detect an impairment in the first communication device;
 determine a second communication device is functioning properly, wherein the first communication device and the second communication device are downstream of the distribution device; and
 recommend service to a portion of the network downstream of the distribution device and upstream of the first communication device based on the topology of the network and the impairment.

18. The method of claim 5, further comprising:
 detecting a first impairment in the first communication device;
 detecting a second impairment in the second communication device; and
 recommending service to a portion of the network where the first path and the second path are shared by the network based on the topology of the network, the first impairment, and the second impairment.

19. The method of claim 18, further comprising, servicing the portion of the network where the first path and the second path are shared by the network.

20. The method of claim 5, further comprising:
 detecting a first impairment in the first communication device;
 determining the second communication device is functioning properly; and
 recommending service to a portion of the network on the first path that is not shared with the second path based on the topology of the network and the first impairment.

* * * * *